United States Patent
Tian et al.

(10) Patent No.: US 11,990,808 B2
(45) Date of Patent: May 21, 2024

(54) MOTOR COOLING SYSTEM, MOTOR STATOR AND DISC MOTOR

(71) Applicant: ZHEJIANG PANGOOD POWER TECHNOLOGY CO., LTD., Zhejiang (CN)

(72) Inventors: Jingcheng Tian, Jinhua (CN); Zheng Yuan, Jinhua (CN); Houjia Huang, Jinhua (CN); Chenyu Xia, Jinhua (CN)

(73) Assignee: ZHEJIANG PANGOOD POWER TECHNOLOGY CO., LTD., Jinhua (CN)

( * ) Notice: Subject to any disclaimer, the term of this patent is extended or adjusted under 35 U.S.C. 154(b) by 335 days.

(21) Appl. No.: 17/624,800

(22) PCT Filed: Sep. 11, 2020

(86) PCT No.: PCT/CN2020/114633
§ 371 (c)(1),
(2) Date: Jan. 4, 2022

(87) PCT Pub. No.: WO2021/135374
PCT Pub. Date: Jul. 8, 2021

(65) Prior Publication Data
US 2022/0255404 A1   Aug. 11, 2022

(30) Foreign Application Priority Data

Dec. 31, 2019  (CN) .......................... 201911413885.7
Dec. 31, 2019  (CN) .......................... 201922502607.0

(51) Int. Cl.
*H02K 3/24* (2006.01)
*H02K 1/20* (2006.01)
(Continued)

(52) U.S. Cl.
CPC ................. *H02K 3/24* (2013.01); *H02K 1/20* (2013.01); *H02K 9/19* (2013.01); *H02K 9/197* (2013.01); *H02K 21/24* (2013.01)

(58) Field of Classification Search
CPC .... H02K 1/182; H02K 1/2793; H02K 21/026; H02K 21/24; H02K 9/197; H02K 3/24;
(Continued)

(56) References Cited

U.S. PATENT DOCUMENTS

2010/0045125 A1* 2/2010 Takenaka ................. H02K 9/19
                                                         310/54
2011/0221287 A1  9/2011 Lucchi
(Continued)

FOREIGN PATENT DOCUMENTS

CN     103001385 A    3/2013
CN     203056802 U    7/2013
(Continued)

OTHER PUBLICATIONS

Cho Yun Hyun, Flat Type Rotating Apparatus, Mar. 22, 2012, KR 101120821 (English Machine Translation) (Year: 2012).*
(Continued)

*Primary Examiner* — Alexander A Singh
(74) *Attorney, Agent, or Firm* — Kilpatrick Townsend & Stockton LLP

(57) ABSTRACT

A motor cooling system, a motor stator and a disc motor. The motor cooling system comprises an insulated cooling pipeline (2); the insulated cooling pipeline is mounted on a stator housing, the top surface of the insulated cooling pipeline is lower than or flush with the top surface of a stator iron core, and the bottom surface of the insulated cooling pipeline touches a coil of the motor stator for use in cooling the coil; the top surface of the stator iron core is configured to being arranged relative to a rotor, so that a magnetic field gener-
(Continued)

ated by the coil can interact with a rotor permanent magnet. Since the outer bottom surface of the insulated cooling pipeline touches the coil of the motor stator, a liquid coolant in the insulated cooling pipeline can cool the coil by means of heat conduction.

17 Claims, 4 Drawing Sheets

(51) Int. Cl.
*H02K 9/19* (2006.01)
*H02K 9/197* (2006.01)
*H02K 21/24* (2006.01)

(58) Field of Classification Search
CPC ............ H02K 1/20; H02K 5/203; H02K 1/18; H02K 15/02; H02K 1/27; H02K 16/00; H02K 9/19; H02K 9/00; H02K 9/16; H02K 9/22; H02K 9/225
USPC .................................................... 310/156.32
See application file for complete search history.

(56) References Cited

U.S. PATENT DOCUMENTS

| 2011/0316358 | A1 | 12/2011 | Sugita et al. |
| 2013/0147291 | A1* | 6/2013 | Woolmer ................. H02K 1/14 |
| | | | 310/58 |

FOREIGN PATENT DOCUMENTS

| CN | 203537176 U | | 4/2014 |
| CN | 108092451 A | | 5/2018 |
| CN | 208522563 U | | 2/2019 |
| CN | 208539670 U | | 2/2019 |
| CN | 211127334 U | | 7/2020 |
| JP | 2009033898 A | | 2/2009 |
| KR | 101120821 | * | 3/2012 |

OTHER PUBLICATIONS

PCT International Search Report and Written Opinion, International Application No. PCT/CN2020/114633, dated Dec. 10, 2020, 14 Pages.
European Patent Office, Extended European Search Report Issued in Application No. 20909552.0, Dec. 15, 2023, Germany, 11 pages.

* cited by examiner

MOTOR COOLING SYSTEM, MOTOR STATOR AND DISC MOTOR

This disclosure is 35 U.S.C. 371 Patent Application of PCT Application No. PCT/CN2020/114633, filed on Sep. 11, 2020 which claims priorities to the following two Chinese patent disclosures, each of which are incorporated herein by reference in their entireties, 1) Chinese Patent Disclosure No. 201911413885.7, titled "MOTOR COOLING SYSTEM, MOTOR STATOR AND DISC MOTOR", filed with the China National Intellectual Property Administration on Dec. 31, 2019; and 2) Chinese Patent Disclosure No. 201922502607.0 titled "MOTOR COOLING SYSTEM, MOTOR STATOR AND DISC MOTOR", filed with the China National Intellectual Property Administration on Dec. 31, 2019.

FIELD

The present disclosure relates to the technical field of motors, and in particular to a motor cooling system, motor stator and disc motor.

BACKGROUND

No matter a motor is operating as a motor or a generator, energy loss will occur in the coil, which causes the temperature of the motor to rise, and if not cooled, the motor may be burned out and fail.

SUMMARY

In view of this, a first object of the present disclosure is to provide a motor cooling system, which can cool the motor coil and avoids the motor of being burned down due to the temperature rise of the motor.

A second object of the present disclosure is to provide a motor stator;

A third object of the present disclosure is to provide a disc motor.

In order to achieve the first object mentioned above, the following solutions are provided according to the present disclosure.

A motor cooling system for cooling a motor stator, which includes an insulated cooling pipeline;
  the insulated cooling pipeline is mounted in the stator housing, and a top surface of the insulated cooling pipeline is lower than or flush with a top surface of a stator iron core; a bottom surface of the insulated cooling pipeline is in contact with a coil of the motor stator for cooling the coil;
  the top surface of the stator iron core is arranged opposite to the rotor, so that the magnetic field generated by the coil interacts with a permanent magnet of the rotor.

In a specific embodiment, the insulated cooling pipeline includes a coil outer ring cooling pipeline;
  the coil outer ring cooling pipeline is in contact with an outer ring of the coil and is configured to cool the outer ring of the coil.

In another specific embodiment, the insulated cooling pipeline further includes a coil inner ring cooling pipeline;
  the coil inner ring cooling pipeline is in contact with an inner ring of the coil and is configured to cool the inner ring of the coil.

In another specific embodiment, the insulated cooling pipeline further includes a coil intermediate cooling pipeline;
  two ends of the coil intermediate cooling pipeline are connected to the coil inner ring cooling pipeline and the coil outer ring cooling pipeline, respectively, and the coil intermediate cooling pipeline is in contact with an intermediate connection portion of the coil to cool the intermediate connection portion of the coil;
  the intermediate connection portion of the coil refers to a connection portion connecting the inner ring and the outer ring of the coil.

In another specific embodiment, a number of the coil intermediate cooling pipeline, the coil inner ring cooling pipeline, and the coil outer ring cooling pipeline are all plural;
  the coil inner ring cooling pipelines and the coil outer ring cooling pipelines are spaced apart, and each of the coil inner ring cooling pipelines only contacts the inner ring of one of the coils, each of the coil outer ring cooling pipelines only contacts the outer ring of one of the coils;
  two ends of the coil intermediate cooling pipeline are connected to one end of the coil inner ring cooling pipeline and one end of the coil outer ring cooling pipeline, respectively;
  and/or,
  the insulated cooling pipeline is made of insulating ceramic or nylon;
  and/or,
  a cross section of the insulated cooling pipeline is rectangular.

In another specific embodiment, the motor cooling system further includes an iron core cooling passage;
  the iron core cooling passage is provided in the stator housing, located at the bottom of the stator iron core of the motor stator, and is configured to cool the stator iron core.

In another specific embodiment, the iron core cooling passage includes a first outer passage, a second outer passage and an inner passage;
  the first outer passage and the second outer passage are both arranged outside the inner passage, and one end of the first outer passage is connected with one end of the inner passage, and the other end of the first outer passage is the inlet end of the iron core cooling passage; and
  the other end of the inner passage is connected to one end of the second outer passage, and the other end of the second outer passage is the outlet end of the iron core cooling passage; and
  the inlet end and the outlet end of the iron core cooling passage are both provided in the same side of the stator housing.

The various embodiments according to the present disclosure can be in any combinations as required, and the embodiments obtained after these combinations are also within the scope of the present disclosure and are a part of the specific embodiments of the present disclosure.

In a specific embodiment of the present disclosure, during the operation of the motor cooling system disclosed by the present disclosure, circulating cooling liquid is introduced into insulated cooling pipelines. Since the outer bottom surface of the insulated cooling pipeline is in contact with the coil of the motor stator, the cooling liquid in the insulated cooling pipeline can cool the coil through heat conduction. The present disclosure realizes the cooling to the motor coil, and avoids the motor temperature rise causing the motor to be burnt down.

In addition, since the top surface of the insulated cooling pipeline is lower than or flush with the top surface of the stator iron core, it is possible to prevent the coolant in the insulated cooling pipeline from affecting the magnetic gap between the motor rotor and the motor stator.

In order to achieve the second object mentioned above, the following solution is provided according to the present disclosure.

A motor stator is provided, which includes a stator housing, an iron core and a coil, and further includes the motor cooling system as described in any one of the above;

a first positioning groove is provided in one of a circumferential direction of the outer wall of the stator iron core and a circumferential direction of the inner wall of the stator housing, and a first positioning protrusion matched with the first positioning groove is provided in the other one of the circumferential direction of the outer wall of the stator iron core and the circumferential direction of the inner wall of the stator housing; the stator iron core is stuck in the stator housing;

the coil is embedded in an iron core slot of the stator core, and the top surface of the coil is lower than the top of the iron core slot.

In a specific embodiment of the present disclosure, the motor stator further includes a bearing chamber;

the bearing chamber is mounted in the stator housing and is arranged coaxially with the stator housing;

an outer circle mounting hole is provided in a top end of the stator housing, and an inner circle mounting hole is provided in a top end of the bearing chamber; an outer wall of the insulated cooling pipeline is connected with the outer circular mounting hole by a screw, and an inner wall of the insulated cooling pipeline is connected with the inner circular mounting hole inner by a screw;

a second positioning groove is provided in one of the circumferential direction of the inner wall of the stator iron core and the circumferential direction of the outer wall of the bearing chamber, and a second positioning protrusion matched with the second positioning groove is provided in the other one of the circumferential direction of the inner wall of the stator iron core and the circumferential direction of the outer wall of the bearing chamber;

and/or, a bottom surface of the insulated cooling pipeline is in contact with the top surface of the coil, a top surface of the insulating cooling pipeline is flush with the top of the iron core slot.

Since the motor stator provided by the present disclosure includes any one of the motor cooling systems mentioned above, the beneficial effects of the motor cooling system provided by the present disclosure are all included in the motor stator provided by the present disclosure.

In addition, since a positioning groove is provided in one of the circumferential direction of the outer wall of the iron core and the circumferential direction of the inner wall of the stator housing, and a positioning protrusion matched with the positioning groove is provided in the other one of the circumferential direction of the outer wall of the iron core and the circumferential direction of the inner wall of the stator housing, it facilitates the positioning and installation of the iron core and prevents the iron core from rotating.

In order to achieve the third object mentioned above, the following solution is provided according to the present disclosure.

A disc motor is provided, which includes the motor stator as described above.

Since the disc motor provided by the present disclosure includes any of the motor stators mentioned above, the beneficial effects of the motor stator provided by the present disclosure are all included in the disc motor provided by the present disclosure.

BRIEF DESCRIPTION OF THE DRAWINGS

For more clearly illustrating the technical solutions of embodiments of the present application or in the conventional technology, drawings referred to for describing the embodiments or the conventional technology will be briefly described hereinafter. Apparently, the drawings in the following description are only several examples of the present application, and for those skilled in the art, other drawings may be obtained based on these drawings without any creative efforts.

REFERENCE NUMERALS IN FIG. 1 TO FIG. 6

Figure 1:
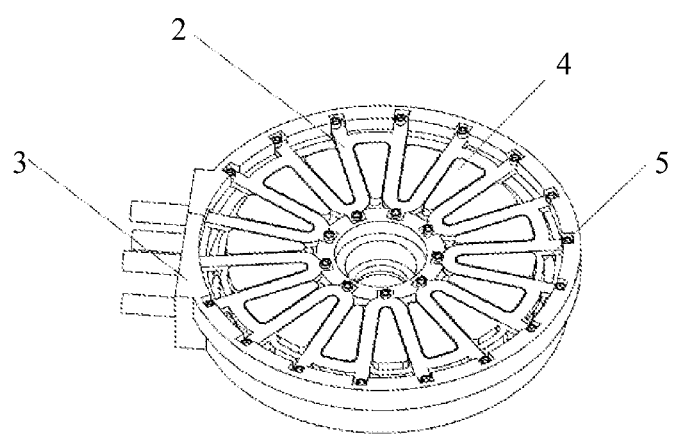
FIG. 1 is a schematic structural diagram of a motor stator provided by the present disclosure.
Figure 2:
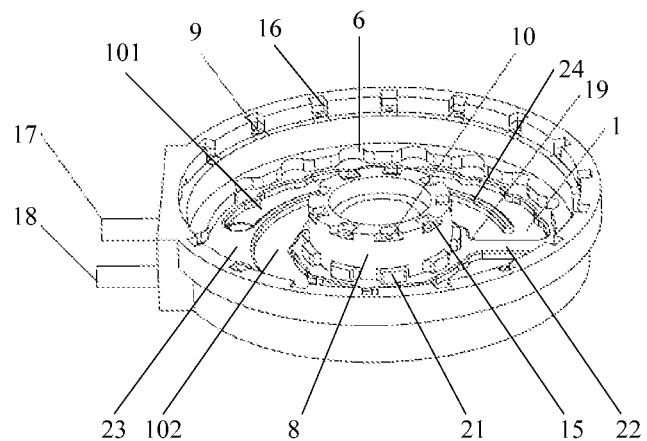
FIG. 2 is a schematic structural diagram of a stator housing of a motor stator provided by the present disclosure.
Figure 3:
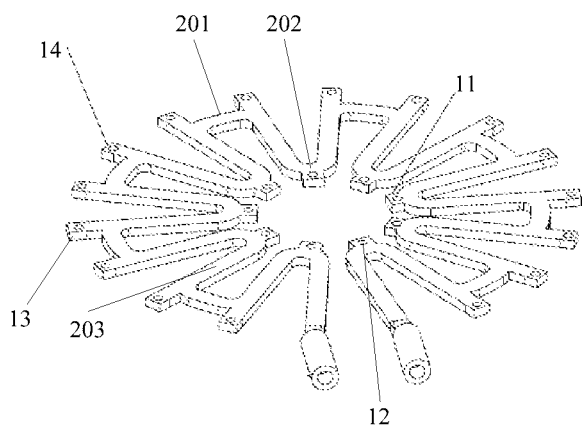
FIG. 3 is a schematic structural diagram of the insulated cooling pipeline of the motor cooling system provided by the present disclosure.
Figure 4:
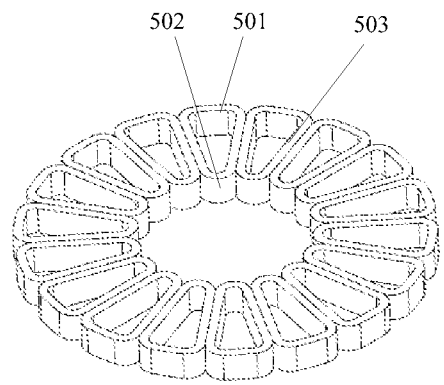
FIG. 4 is a schematic structural diagram of a coil of a motor stator provided by the present disclosure.
Figure 5:
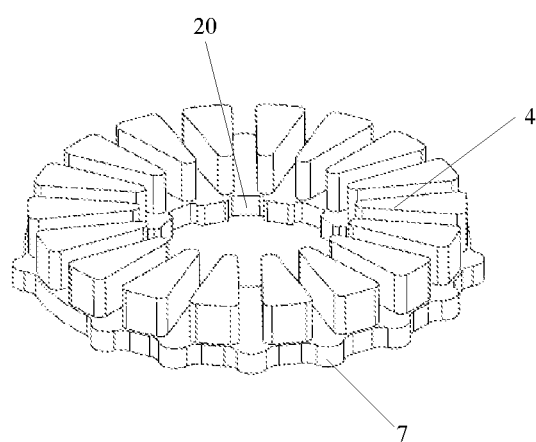
FIG. 5 is a schematic structural diagram of an iron core of a motor stator provided by the present disclosure.
Figure 6:
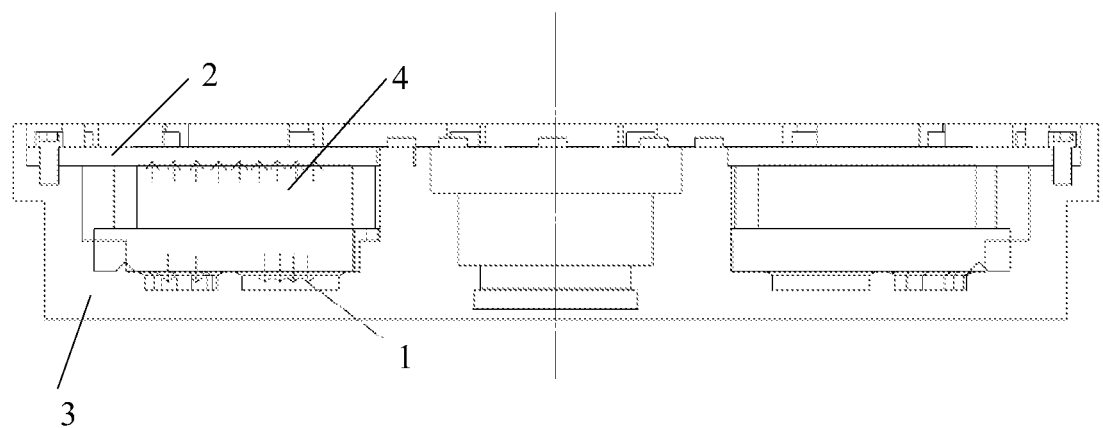
FIG. 6 is a structural diagram of the motor stator provided by the present disclosure in case of being cooled.

1 iron core cooling passage, 2 insulated cooling pipeline, 3 stator housing, 4 stator iron core, 5 coil, 201 coil outer ring cooling pipeline, 501 outer ring, 202 coil inner ring cooling pipeline, 502 inner ring, 203 coil intermediate cooling pipeline, 503 intermediate connection portion, 101 first outer passage, 102 inner passage, 6 first positioning groove, 7 first positioning protrusion, 8 bearing chamber, 9 outer circle mounting hole, 10 inner circle mounting hole, 11 first extension block, 12 first mounting hole, 13 second extension block, 14 second mounting hole, 15 first concave groove, 16 second concave groove, 17 coolant inlet pipe, 18 coolant outlet pipe, 19 mounting surface, 20 second positioning groove, 21 second positioning protrusion, 22 first partition wall, 23 second partition wall, 24 arc wall.

DETAILED DESCRIPTION OF THE EMBODIMENTS

In order to make those skilled in the art better understand the technical solution of the present disclosure, the present disclosure will be further described in detail with reference to FIG. 1 to FIG. 6 and specific embodiments.

Embodiment 1

A motor cooling system is provided according to the present disclosure, and is configured to cool a motor stator. The motor cooling system includes an insulated cooling pipeline 2.

The insulated cooling pipeline 2 is mounted in a stator housing 3. In addition, the top surface of the insulated cooling pipe 2 is lower than or flushes with the top surface of a stator iron core 4 to prevent the coolant in the insulated cooling pipeline 2 from affecting a magnetic gap between the motor rotor and the motor stator. It should be noted that the top surface of the insulated cooling pipeline 2 may also be slightly higher than the top surface of the stator iron core 4.

The outer bottom surface of the insulated cooling pipeline 2 is in contact with a coil 5 of the motor stator, and is configured to cool the coil 5. It should be noted that the insulated cooling pipeline 2 needs to have good insulating property and thermal conductivity, and be non-magnetic and non-conductive. Specifically, the insulated cooling pipeline 2 may be made of ceramic material, or nylon material, etc.

The top surface of the stator iron core 4 is arranged opposite to the rotor, so that the magnetic field generated by the coil 5 interacts with the permanent magnet of the rotor. An external alternating current is introduced into the coil 5, and the magnetic field generated by said current acts on the rotor of the motor through the conduction of the stator iron core 4 to drive the rotor to rotate, thereby converting electrical energy to mechanical energy. Alternatively, an external rotating machine drives the rotor to rotate, and the magnetic field of the rotor acts on the coil 5 through the conduction of the stator iron core 4 to generate electrical energy, thereby converting mechanical energy to electrical energy.

In the case that the motor cooling system disclosed by the present disclosure is in operation, circulating liquid coolant is introduced into the insulated cooling pipeline 2. Since the outer bottom surface of the insulated cooling pipeline 2 is in contact with the coil 5 of the motor stator, the liquid coolant in the insulated cooling pipeline 2 cools the coil 5 through heat conduction. The present disclosure realizes the cooling to the motor coil 5, and avoids the motor temperature to rise and thus cause the motor to be burnt down.

In addition, since the top surface of the inner wall of the insulated cooling pipeline 2 is lower than or flush with the top surface of the stator iron core 4, it is possible to prevent the coolant in the insulated cooling pipeline 2 from affecting the magnetic gap between the motor rotor and the motor stator.

Embodiment 2

In the second embodiment according to the present disclosure, the structure of the motor cooling system in this embodiment is similar to that in the first embodiment, so the similarities will not be described again, and only the differences will be introduced.

In this embodiment, the present disclosure specifically discloses that the insulated cooling pipeline 2 includes a coil outer ring cooling pipeline 201. The coil outer ring cooling pipeline 201 is in contact with the outer ring 501 of the coil 5 for cooling the outer ring 501 of the coil 5. Specifically, the outer ring 501 of the coil 5 refers to the side of the coil 5 away from the axis of the stator iron core 4.

In this embodiment, the present disclosure specifically discloses that the insulated cooling pipeline 2 includes a coil inner ring cooling pipeline 202. The coil inner ring cooling pipeline 202 is in contact with the inner ring 502 of the coil 5 for cooling the inner ring 502 of the coil 5. Specifically, the outer ring 501 of the coil 5 refers to the side of the coil 5 close to the axis of the stator iron core 4.

It should be noted that the insulated cooling pipeline 2 may only include the coil outer ring cooling pipeline 201, or only include the coil inner ring cooling pipeline 202. The insulated cooling pipeline 2 may also include both the coil outer ring cooling pipeline 201 and the coil inner ring cooling pipeline 202. In this embodiment, it is taken as an example that the insulated cooling pipeline 2 includes both the coil outer ring cooling pipeline 201 and the coil inner ring cooling pipeline 202.

Further, the present disclosure discloses that the insulated cooling pipeline 2 further includes a coil intermediate cooling pipeline 203. The two ends of the coil intermediate cooling pipeline 203 are connected to the coil inner ring cooling pipeline 202 and the coil outer ring cooling pipeline 201, respectively. The coil intermediate cooling pipeline 203 is in contact with the intermediate connection portion 503 of the coil 5 to cool the intermediate connection portion 503 of the coil 5, thereby further improving the cooling efficiency of the insulated cooling pipeline 2 to the coil 5. Specifically, the intermediate connection portion 503 of the coil 5 refers to the connection portion connecting the inner ring 502 and the outer ring 501 of the coil 5.

It should be noted that each of the coil intermediate cooling pipeline 203, the coil inner ring cooling pipeline 202, and the coil outer ring cooling pipeline 201 can be conducted to form a circulation circuit.

Further, the present disclosure discloses that the number of the coil intermediate cooling pipeline 203, the coil inner ring cooling pipeline 202 and the coil outer ring cooling pipeline 201 are all multiple. The coil inner ring cooling pipeline 202 and the coil outer ring cooling pipeline 201 are spaced apart in sequence, and each coil inner ring cooling pipeline 202 only contacts the inner ring 502 of one coil 5, and each coil outer ring cooling pipeline 201 only contacts the outer ring 501 of one coil 5. The two ends of the coil intermediate cooling pipeline 203 are connected to one end of the coil inner ring cooling pipeline 201 and one end of the coil outer ring cooling pipeline 202, respectively. It should be noted that the lengths of the coil outer ring cooling pipelines 201 may be different, which may only cover the length of outer ring 501 of one coil 5, or may simultaneously cool the lengths of the outer rings 501 of at least two adjacent coils 5, and it may be set according to specific requirements. The lengths of the coil inner ring cooling pipelines 202 may be different, which may only cover the length of inner ring 502 of one coil 5, or may simultaneously cool the lengths of the inner rings 502 of at least two adjacent coils 5, and it may be set according to specific requirements.

In order to facilitate the connection between the insulated cooling pipeline 2 and the stator housing 3, the present disclosure discloses that the top end of the stator housing 3 is provided with an outer circle mounting hole 9, and the top end of the bearing chamber 8 is provided with an inner circle mounting hole 10. A first extension block 11 is provided at the side of the coil inner ring cooling pipeline 202 close to the axis of the stator iron core 4, and the first extension block 11 is provided with a first mounting hole 12. The screw passes through the first mounting hole 12 and the inner circle mounting hole 10 to connect the coil inner ring cooling pipeline 202 and the bearing chamber 8. The end of the coil intermediate cooling pipeline 203 connected to the coil inner ring cooling pipeline 202 extends in a direction away from the axis of the iron core to form a second extension block 13. The second extension block 13 is provided with a second mounting hole 14. The screw passes through the second mounting hole 14 and the outer circle mounting hole 9 to connect the coil intermediate cooling pipeline 203 and the stator housing 3. Specifically, the coil intermediate cooling pipeline 203, the coil inner ring cooling pipeline 202, and the coil outer ring cooling pipeline 201 are integrally formed and connected.

In order to prevent the screws from being exposed, the present disclosure discloses that a first concave groove 15 is provided at the top end of the bearing chamber 8. The inner circle mounting hole 10 is provided at the bottom of the first concave groove 15, the first extension block 11 is placed in the first concave groove 15, and the nut of the screw is placed in the first concave groove 15. A second concave groove 16 is provided at the top end of the stator housing 3, the outer circle mounting hole 9 is arranged at the bottom of the second concave groove 16, the second extension block 13 is placed in the second concave groove 16, the nut of the screw is placed in the second concave groove 16.

Specifically, the present disclosure discloses that the insulated cooling pipeline 2 is made of insulated ceramic or nylon, and it should be noted that it may also be made of other materials that are insulated, corrosion resistant, non-magnetic and non-conductive.

In this embodiment, as an example, the insulated cooling pipeline 2 is made of insulating ceramics. The insulated cooling pipeline 2 will be in operation at 180° C. for a long time and the deformation of which does not exceed 0.1 mm, and the wall thickness of insulated cooling pipeline 2 is between 0.5 mm-3 mm.

In order to increase the contact area between the insulated cooling pipeline 2 and the coil 5 and further improve the cooling efficiency to the coil 5, the present disclosure discloses that the cross section of the insulated cooling pipeline 2 is rectangular, that is, the insulated cooling pipeline 2 is a rectangular pipe, but may also be pipes in other shapes such as a trapezoidal pipe.

Further, the present disclosure discloses that the motor cooling system further includes an iron core cooling passage 1. Specifically, the iron core cooling passage 1 is provided in the stator housing 3 at the bottom of the stator iron core 4 of the motor stator, and is configured to cooling the stator iron core 4. Specifically, the iron core cooling passage 1 is a slot with the top end being open, and the shape of the trajectory of the iron core cooling passage 1 is not limited, which can be circular arc, square, etc., or a combination of several different curves or straight lines, etc. The stator housing 3 is further provided with a coolant inlet pipe 17 and a coolant outlet pipe 18, which are conductively connected to the outlet and the inlet of the iron core cooling passage 1, respectively. During operation, the circulating liquid coolant is introduced into the iron core cooling passage 1. Since the iron core cooling passage 1 is provided in the stator housing 3 and is located at the bottom of the stator iron core 4 of the motor stator, the coolant in the iron core cooling passage 1 circulates to remove the heat emitted by the stator iron core 4 and further reduces the risk of the motor being burned down due to the temperature rise of the motor.

Furthermore, the present disclosure discloses that the iron core cooling passage 1 includes a first outer passage 101, a second outer passage and an inner passage 102. The first outer passage 101 and the second outer passage are both arranged outside the inner passage 102, and one end of the first outer passage 101 is connected with one end of the inner passage 102, and the other end of the first outer passage 101 is the inlet end of the iron core cooling passage 1. The other end of the inner passage 102 is connected to one end of the second outer passage, and the other end of the second outer passage is the outlet end of the iron core cooling passage 1. The inlet end and the outlet end of the iron core cooling passage 1 are both opened at the same side of the stator housing. The arranging configuration of the first outer passage 101, the second outer passage and the inner passage 102 increases the time of the liquid coolant being in the iron core cooling passage 1 and sufficiently removes the heat dissipated by the stator iron core 4.

It should be noted that the number and shape of the first outer passage 101, the second outer passage and the inner passage 102 are not limited, and any shape can be available, for example, circular arc passages, straight passages, etc.

Specifically, the present disclosure discloses that the first outer passage 101, the second outer passage and the inner passage 102 are arc-shaped passages, and the axes of the first outer passage 101, the second outer passage and the inner passage 102 are coincident.

Specifically, the stator housing 3 is provided with a bearing chamber 8 in which the bearing is mounted, the outer wall of the bearing chamber 8 and the inner wall of the stator housing 3 are connected with a first partition wall 22, and the first partition wall 22 partitions the annular passage enclosed by the bearing chamber 8 and the inner wall of the stator housing 3. An arc wall 24 is provided at the inner bottom of the stator housing 3, and the arc wall 24 is located in the annular passage. The head and tail of the arc wall 24 are located at both ends of the first partition wall 22, respectively. The outer side of the arc wall 24 and the inner wall of the stator housing 3 are connected with a second partition wall 23. The second partition wall 23 separates the passage enclosed by the outer side of the arc wall 24 and the inner wall of the stator housing 3. The inlet and the outlet of the iron core cooling passage 1 are located at two sides of the second partition wall 23, respectively. The first outer passage 101 is formed by being enclosed with the second partition wall 23, the inner wall of the stator housing 3, the outer wall of the arc wall 24 (here refers to the length of the arc wall 24 from the side including the inlet of the iron core cooling passage 1 to the first partition wall 22) and the first partition wall 22. The inner passage 102 is formed by being enclosed with the inner wall of the arc wall 24, the outer wall of the bearing chamber 8 and the first partition wall 22. The first outer passage 101 is formed by being enclosed with first partition wall 22, the inner wall of the stator housing 3, the outer wall of the arc wall 24 (here refers to the length of the arc wall 24 from the side including the outlet of the iron core cooling passage 1 to the first partition wall 22) and the second partition wall 23.

Embodiment 3

A motor stator is provided according to the present disclosure, which includes a stator housing 3, a stator iron core 4, a coil 5 and the motor cooling system according to any one of the above embodiments.

A first positioning groove 6 is provided in one of a circumferential direction of the outer wall of the stator iron core 4 and a circumferential direction of the inner wall of the stator housing 3, and a first positioning protrusion 7 matched with the first positioning groove 6 is provided in the other one of the circumferential direction of the outer wall of the stator iron core 4 and the circumferential direction of the inner wall of the stator housing 3.

Further, the present disclosure discloses that the number of the first positioning groove 6 and the first positioning protrusion 7 is multiple. In this embodiment, the first positioning protrusions 7 are uniformly distributed in the circumferential direction of the outer wall of the stator iron core 4. For example, the first positioning grooves 6 are uniformly provided in the circumferential direction of the inner wall of the stator housing 3, and the first positioning protrusions 7 are hold in the first positioning grooves 6, which facilitates the installation and positioning of the stator iron core 4.

Specifically, the stator iron core 4 is stuck in the stator housing 3, which avoids magnetic leakage caused by opening holes in the stator iron core 4. Specifically, the stator iron core 4 is a hollow ring with providing radial slots in the circumferential. The main function of the stator iron core 4 is to conduct magnetism, that is, to provide a magnetic flux path for the magnetic field generated in the coil. The stator iron core 4 is made of a metal composite material with magnetic permeability.

The coil 5 is embedded in the iron core slots of the stator iron core 4, and the top surface of the coil 5 is lower than the slot top of the iron core slots, so that a gap is formed between the top surface of the coil 5 and the slot top of the iron core slots, which facilitate placing the insulated cooling pipeline 2 in the gap while the top surface of the insulated cooling pipeline 2 is lower than, flush with or slightly higher than the slot top of the iron core slots. In this embodiment, the bottom surface of the insulated cooling pipeline 2 is in contact with the top surface of the coil 5, and the top surface of the insulated cooling pipeline 2 is flush with the slot top of the iron core slots.

Further, the present disclosure further discloses that the motor stator further includes a bearing chamber 8, which is mounted in the stator housing 3 and arranged coaxially with the stator housing 3. An outer circle mounting hole 9 is provided at the top end of the stator housing 3, and an inner circle mounting hole 10 is provided at the top end of the bearing chamber 8. The outer wall of the insulated cooling pipeline 2 is connected with the outer circle mounting hole 9 by screws, and the inner wall of the insulated cooling pipeline 2 is connected with the inner circle mounting hole 10 by screws, which facilitates disassembly and installation of the insulated cooling pipeline 2.

Further, the present disclosure discloses that a second positioning groove 20 is provided in one of the circumferential direction of the inner wall of the stator iron core 4 and the circumferential direction of the outer wall of the bearing chamber 8, and a second positioning protrusion 21 matched with the second positioning groove 20 is provided in the other one of the circumferential direction of the inner wall of the stator iron core 4 and the circumferential direction of the outer wall of the bearing chamber 8.

Further, the present disclosure discloses that the number of the second positioning groove 20 and the second positioning protrusion 21 is multiple. In this embodiment, the second positioning groove 20 is provided in the circumferential direction of the inner wall of the stator iron core 4. For example, the second positioning protrusions 21 are uniformly provided in the circumferential direction of the outer wall of the bearing chamber 8 and the second positioning protrusions 21 are hold in the second positioning grooves 20, which facilitates the installation and positioning of the stator iron core 4.

During assembling the stator of the motor disclosed in the present disclosure, first, place a stator housing 3 on a horizontal installation table with the opening upward; next, insert a stator iron core 4 into the housing along the axial direction, and glue the housing with a mounting surface 19 of the stator iron core 4; then, insert a coil 5 into the iron core slot of the stator iron core 4 in the axial direction; finally, assemble an insulated cooling pipeline 2 in the axial direction, and fix the insulated cooling pipeline 2 in the stator housing 3 by means of screws being through the outer circle mounting hole 9, a second mounting hole 14, an inner circle mounting hole 10 and a first mounting hole 12.

Since the motor stator provided by the present disclosure includes the motor cooling systems according to any one of the above embodiments, the beneficial effects of the motor cooling system provided by the present disclosure are all included in the motor stator provided by the present disclosure.

In addition, since a first positioning groove 6 is provided in one of the circumferential direction of the outer wall of the stator iron core 4 and the circumferential direction of the inner wall of the stator housing 3, and a first positioning protrusion 7 matched with the first positioning groove 6 is provided in the other one of the circumferential direction of the outer wall of the stator iron core 4 and the circumferential direction of the inner wall of the stator housing 3, a second positioning groove 20 is provided in one of the circumferential direction of the inner wall of the stator iron core 4 and the circumferential direction of the outer wall of the bearing chamber 8, and a second positioning protrusion 21 matched with the second positioning groove 20 is provided in the other one of the circumferential direction of the inner wall of the stator iron core 4 and the circumferential direction of the outer wall of the bearing chamber 8, it facilitates the positioning and installation of the iron core and prevents the iron core from rotating.

Embodiment 4

A disc motor is provided according to the present disclosure, which includes a motor stator according to Embodiment 3.

Since the disc motor provided by the present disclosure includes the motor stator according to Embodiment 3, the beneficial effects of the motor stator provided by the present disclosure are all included in the disc motor provided by the present disclosure.

It should be noted that the terms indicating the orientation in this specification, such as the top surface, the bottom surface, etc., are all defined based on the direction of FIG. 1, which are only for the convenience of description and do not have other specific meanings.

It should be further illustrated that a relation term such as "first" and "second" herein is only used to distinguish one entity or operation from another entity or operation, and does not necessarily require or imply that there is an actual relation or sequence between these entities or operations. Furthermore, terms such as "include", "comprise" or any other variations thereof are intended to be non-exclusive. Therefore, an article or device including a series of elements includes not only the elements but also other elements that are not enumerated, or further includes the elements inherent for the article or device. Unless expressively limited, the statement "including a . . . " does not exclude the case that other similar elements may exist in the article or the device other than enumerated elements.

The principle and the embodiments of the present application are illustrated herein by specific examples. The above description of examples is only intended to help the understanding of the idea of the present application. It should be noted that, for the person skilled in the art, many modifications and improvements may be made to the present application without departing from the principle of the present application, and these modifications and improvements are also deemed to fall into the protection scope of the present application defined by the claims.

The invention claimed is:

1. A motor cooling system for cooling a motor stator, comprising:
an insulated cooling pipeline;
wherein the insulated cooling pipeline is mounted in a stator housing, and a top surface of the insulated cooling pipeline is lower than or flush with a top surface of a stator iron core, a bottom surface of the insulated cooling pipeline is in contact with a coil of the motor stator for cooling the coil;
wherein the top surface of the stator iron core is arranged opposite to a rotor, so that a magnetic field generated by the coil interacts with a permanent magnet of the rotor.

2. The motor cooling system according to claim 1, wherein the insulated cooling pipeline comprises a coil outer ring cooling pipeline;
wherein the coil outer ring cooling pipeline is in contact with an outer ring of the coil and is configured to cool the outer ring of the coil.

3. The motor cooling system according to claim 2, wherein the insulated cooling pipeline further comprises a coil inner ring cooling pipeline;
wherein the coil inner ring cooling pipeline is in contact with an inner ring of the coil and is configured to cool the inner ring of the coil.

4. The motor cooling system according to claim 3, wherein the insulated cooling pipeline further comprises a coil intermediate cooling pipeline;
wherein two ends of the coil intermediate cooling pipeline are connected to the coil inner ring cooling pipeline and the coil outer ring cooling pipeline, respectively, and the coil intermediate cooling pipeline is in contact with an intermediate connection portion of the coil to cool the intermediate connection portion of the coil;
wherein the intermediate connection portion of the coil refers to a connection portion connecting the inner ring and the outer ring of the coil.

5. The motor cooling system according to claim 4, wherein a number of the coil intermediate cooling pipeline, the coil inner ring cooling pipeline, and the coil outer ring cooling pipeline are all plural;
wherein coil inner ring cooling pipelines and coil outer ring cooling pipelines are spaced apart, and each of the coil inner ring cooling pipelines only contacts the inner ring of one of the coils, each of the coil outer ring cooling pipelines only contacts the outer ring of one of the coils;
wherein two ends of the coil intermediate cooling pipeline are connected to one end of the coil inner ring cooling pipeline and one end of the coil outer ring cooling pipeline, respectively;
and/or,
the insulated cooling pipeline is made of insulating ceramic or nylon;
and/or,
a cross section of the insulated cooling pipeline is rectangular.

6. A motor stator, comprising a stator housing, a stator iron core and a coil, and further comprising the motor cooling system according to claim 5;
wherein a first positioning groove is provided in one of a circumferential direction of the outer wall of the stator iron core and a circumferential direction of the inner wall of the stator housing, and a first positioning protrusion matched with the first positioning groove is provided in another one of the circumferential direction of the outer wall of the stator iron core and the circumferential direction of the inner wall of the stator housing, the stator iron core is stuck in the stator housing;
wherein the coil is embedded in an iron core slot of the stator core, and a top surface of the coil is lower than the top of the iron core slot.

7. A motor stator, comprising a stator housing, a stator iron core and a coil, and further comprising the motor cooling system according to claim 2;
wherein a first positioning groove is provided in one of a circumferential direction of the outer wall of the stator iron core and a circumferential direction of the inner wall of the stator housing, and a first positioning protrusion matched with the first positioning groove is provided in another one of the circumferential direction of the outer wall of the stator iron core and the circumferential direction of the inner wall of the stator housing, the stator iron core is stuck in the stator housing;
wherein the coil is embedded in an iron core slot of the stator core, and a top surface of the coil is lower than the top of the iron core slot.

8. A motor stator, comprising a stator housing, a stator iron core and a coil, and further comprising the motor cooling system according to claim 3;
wherein a first positioning groove is provided in one of a circumferential direction of the outer wall of the stator iron core and a circumferential direction of the inner wall of the stator housing, and a first positioning protrusion matched with the first positioning groove is provided in another one of the circumferential direction of the outer wall of the stator iron core and the circumferential direction of the inner wall of the stator housing, the stator iron core is stuck in the stator housing;
wherein the coil is embedded in an iron core slot of the stator core, and a top surface of the coil is lower than the top of the iron core slot.

9. A motor stator, comprising a stator housing, a stator iron core and a coil, and further comprising the motor cooling system according to claim 4;
wherein a first positioning groove is provided in one of a circumferential direction of the outer wall of the stator iron core and a circumferential direction of the inner wall of the stator housing, and a first positioning protrusion matched with the first positioning groove is provided in another one of the circumferential direction of the outer wall of the stator iron core and the circumferential direction of the inner wall of the stator housing, the stator iron core is stuck in the stator housing;
wherein the coil is embedded in an iron core slot of the stator core, and a top surface of the coil is lower than the top of the iron core slot.

10. The motor cooling system according to claim 1, further comprising an iron core cooling passage;
wherein the iron core cooling passage is provided in the stator housing, located at the bottom of the stator iron core of the motor stator, and is configured to cool the stator iron core.

11. The motor cooling system according to claim 10, wherein the iron core cooling passage comprises a first outer passage, a second outer passage and an inner passage;
wherein the first outer passage and the second outer passage are both arranged outside the inner passage, and one end of the first outer passage is connected with one end of the inner passage, and another end of the first outer passage is an inlet end of the iron core cooling passage; and another end of the inner passage is connected to one end of the second outer passage, and another end of the second outer passage is an outlet end of the iron core cooling passage; and the inlet end and the outlet end of the iron core cooling passage are both provided in a same side of the stator housing.

12. A motor stator, comprising a stator housing, a stator iron core and a coil, and further comprising the motor cooling system according to claim 11;

wherein a first positioning groove is provided in one of a circumferential direction of the outer wall of the stator iron core and a circumferential direction of the inner wall of the stator housing, and a first positioning protrusion matched with the first positioning groove is provided in another one of the circumferential direction of the outer wall of the stator iron core and the circumferential direction of the inner wall of the stator housing, the stator iron core is stuck in the stator housing;

wherein the coil is embedded in an iron core slot of the stator core, and a top surface of the coil is lower than the top of the iron core slot.

13. A motor stator, comprising a stator housing, a stator iron core and a coil, and further comprising the motor cooling system according to claim 10;

wherein a first positioning groove is provided in one of a circumferential direction of the outer wall of the stator iron core and a circumferential direction of the inner wall of the stator housing, and a first positioning protrusion matched with the first positioning groove is provided in another one of the circumferential direction of the outer wall of the stator iron core and the circumferential direction of the inner wall of the stator housing, the stator iron core is stuck in the stator housing;

wherein the coil is embedded in an iron core slot of the stator core, and a top surface of the coil is lower than the top of the iron core slot.

14. A motor stator, comprising a stator housing, a stator iron core and a coil, and further comprising the motor cooling system according to claim 1;

wherein a first positioning groove is provided in one of a circumferential direction of an outer wall of the stator iron core and a circumferential direction of an inner wall of the stator housing, and a first positioning protrusion matched with the first positioning groove is provided in another one of the circumferential direction of the outer wall of the stator iron core and the circumferential direction of the inner wall of the stator housing, the stator iron core is stuck in the stator housing;

wherein the coil is embedded in an iron core slot of the stator core, and a top surface of the coil is lower than the top of the iron core slot.

15. The motor stator according to claim 14, further comprising a bearing chamber;

wherein the bearing chamber is mounted in the stator housing and is arranged coaxially with the stator housing;

wherein an outer circle mounting hole is provided in a top end of the stator housing, and an inner circle mounting hole is provided in a top end of the bearing chamber, an outer wall of the insulated cooling pipeline is connected with the outer circular mounting hole by a screw, and an inner wall of the insulated cooling pipeline is connected with the inner circular mounting hole inner by a screw;

wherein a second positioning groove is provided in one of the circumferential direction of the inner wall of the stator iron core and the circumferential direction of the outer wall of the bearing chamber, and a second positioning protrusion matched with the second positioning groove is provided in another one of the circumferential direction of the inner wall of the stator iron core and the circumferential direction of the outer wall of the bearing chamber;

and/or, a bottom surface of the insulated cooling pipeline is in contact with the top surface of the coil, a top surface of the insulating cooling pipeline is flush with the top of the iron core slot.

16. A disc motor, comprising the motor stator according to claim 15.

17. A disc motor, comprising the motor stator according to claim 14.

* * * * *